| United States Patent [19] | [11] | 4,243,798 |
|---|---|---|
| Franklin et al. | [45] | Jan. 6, 1981 |

[54] PROCESS FOR THE PRODUCTION OF A POLYMERIC CARBAMATE

[75] Inventors: Frederick C. Franklin, Pinole; Robert A. Lewis, Berkeley, both of Calif.

[73] Assignee: Chevron Research Company, San Francisco, Calif.

[21] Appl. No.: 65,247

[22] Filed: Aug. 9, 1979

[51] Int. Cl.$^3$ ............................................. C08G 71/04
[52] U.S. Cl. ..................................... 528/371; 528/372
[58] Field of Search ................ 528/371, 372; 560/157, 560/158, 159, 166

[56] References Cited

U.S. PATENT DOCUMENTS

| 2,660,574 | 11/1953 | Jones et al. | 528/371 |
|---|---|---|---|
| 3,254,056 | 5/1966 | Lovell | 528/372 |
| 3,377,322 | 4/1968 | Witsiepe | 528/372 |
| 3,385,833 | 5/1968 | Pariser et al. | 528/372 |
| 3,671,511 | 6/1972 | Honnen et al. | 525/356 |
| 4,160,648 | 7/1979 | Lewis et al. | 44/63 |

*Primary Examiner*—Maurice J. Welsh
*Attorney, Agent, or Firm*—D. A. Newell; S. R. LaPaglia

[57] ABSTRACT

A process for the production of polymeric carbamate from polyalkylene polyamines which provides for the efficient separation of the product mixture into a hydrocarbon phase containing the carbamate and a polyamine phase containing the polyamine hydrochloride salt utilizes an excess of polyamine reactant containing a limited amount of water. The process is particularly suited to the production of monocarbamate.

15 Claims, 1 Drawing Figure

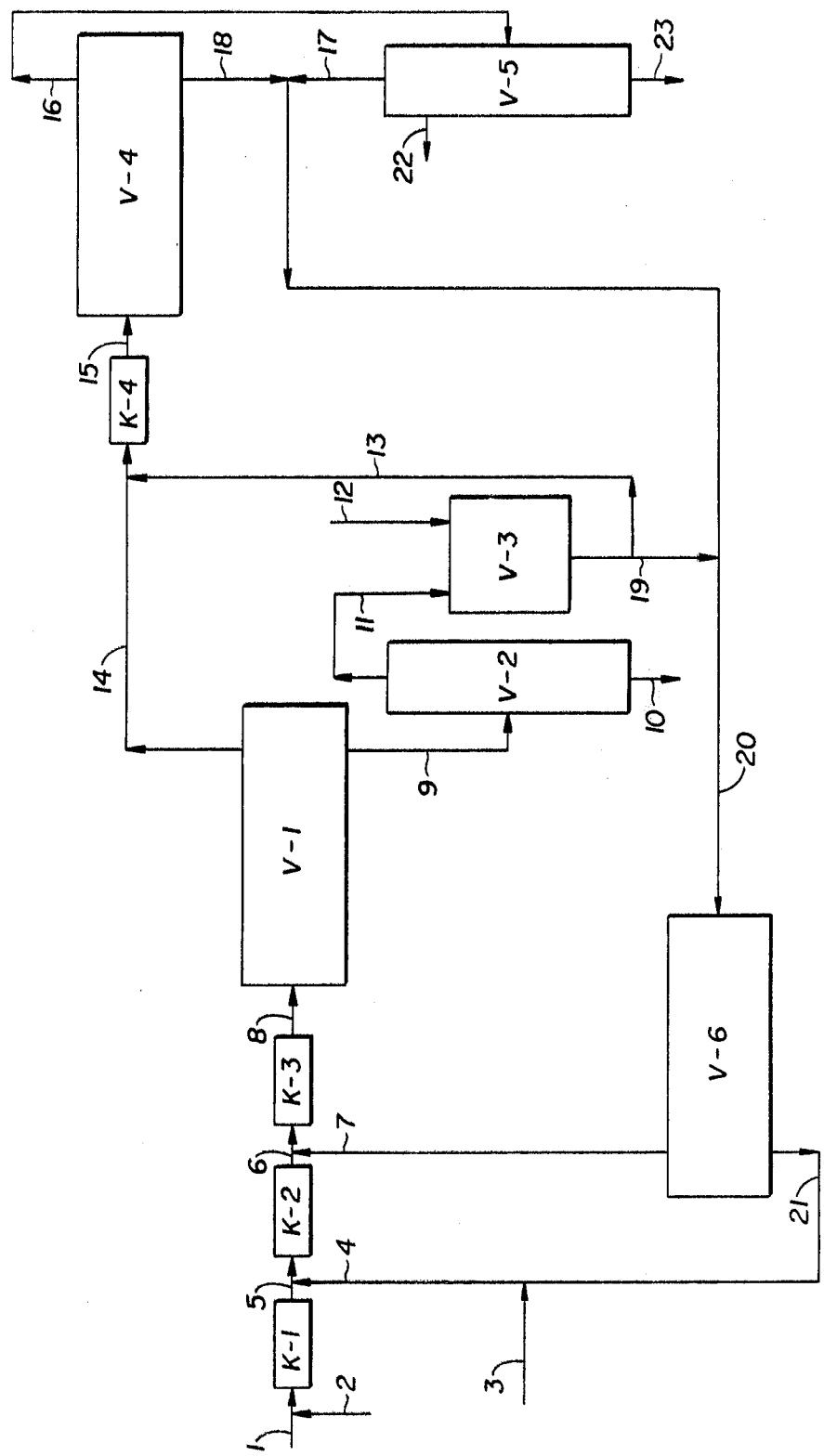

PROCESS FOR THE PRODUCTION OF A POLYMERIC CARBAMATE

BACKGROUND OF THE INVENTION

This invention relates to the production of polymeric carbamates, in particular the continuous production of polymeric carbamates which find use as fuel additives. Such fuel additives, as described in our copending application Ser. No. 801,441, filed May 27, 1977 now U.S. Pat. No. 4,160,648, are highly desirable deposit control additives which effectively limit the deposits in intake systems (carburetor, valves, etc.) without contributing to combustion chamber deposits which cause an increase in the octane requirement of the engine.

Particularly effective additives of this class are monocarbamates produced from polyamines and polymeric chloroformates. By "monocarbamates" is meant carbamates containing a single polyamine moiety linked at an amine nitrogen atom through a carbamate linkage to the oxygen atom of a polyether alcohol. In order to produce substantial amounts of monocarbamate rather than dicarbamate in which two polymeric alcohol moieties are bound to the polyamine at different reactive amine nitrogen atoms, it is necessary to use a large excess of polyamine. Because the reaction between polyamine and polymeric alcohol goes via a polymeric chloroformate intermediate, polyamine hydrochloride is produced in equimolar amount to the desired carbamate. Chloride is untenable in automotive fuels and causes corrosion and plugging of process equipment and should be reduced to very low levels before final separation of the monocarbamate product.

The removal of the hydrochloride salt with recovery of the excess polyamine poses formidable problems. Phase separation between a hydrocarbon phase containing the carbamate product and a polyamine phase containing the hydrochloride salt is a possible procedure. However, the polyamine is in general soluble in the hydrocarbon phase so that the use of large excess polyamine results in a large hydrocarbon phase and a small hydrochloride-containing phase. The hydrochloride-containing phase then forms small droplets distributed through the hydrocarbon phase, fails to agglomerate and/or settles too slowly to allow continuous operation. Washing the product with sufficient water to remove the hydrochloride, or a combination of alcohol and water, has been used in the past, but produces a polyamine-water-polyamine hydrochloride separation problem which is complicated by the large amounts of water present. (If water alone is used in washing, it tends to form an emulsion unless some low-molecular-weight alkanol is also present. This presents further separational complexity.) The complete removal of chloride ion from the product is required for efficient separation of the product carbamate by distillation and the use of the carbamate in gasoline fuels. A stringent upper limit of about 10 ppm or less of chloride ion is specified for the hydrocarbon phase containing the carbamate.

DESCRIPTION OF THE PRIOR ART

U.S. Pat. No. 3,671,511 describes the process of separating the product of the reaction of a polymeric olefin chloride with an amine by charging hydrocarbon diluent, an alkanol and water to the product.

SUMMARY OF THE INVENTION

In the process of the present invention, advantage is taken of the solubility of polyalkylene polyamine, hereinafter called polyamine, in water to create an aqueous polyamine hydrochloride phase which separates from the hydrocarbon phase easily and quickly enough for continuous operation. The rapid separation is accomplished by the addition of a small amount of water to a very large excess of polyamine prior to the reaction between the polyamine and the polymeric chloroformate. The addition of a limited amount of water prevents the dispersion of the hydrochloride-containing phase as droplets in the hydrocarbon phase, yet produces no emulsion.

This process for the production of a polymeric carbamate comprises a first step of very rapidly contacting and thoroughly mixing at a temperature of about 0° to about 150° C. reactant streams of polymeric chloroformate and polyamine to form a product mixture. Said reactant stream of polymeric chloroformate contains from 20 to 80 weight percent polymeric chloroformate in a hydrocarbon solvent. Said reactant stream of polyamine contains about 6-35 weight percent water. The mol ratio of polyamine to polymeric chloroformate in said streams is from about 5:1 to about 45:1. In a second step, said product mixture is allowed to separate at a temperature of from about 20° C. to about 120° C. into two phases, namely, a hydrocarbon phase principally comprising a hydrocarbon solvent, polymeric carbamate and polyamine, and an aqueous phase principally comprising water, polyamine and polyamine hydrochloride.

BRIEF DESCRIPTION OF THE DRAWING

The drawing is a schematic flow diagram of one embodiment of the invention whereby preparation of a polymeric carbamate is achieved by continuously reacting a polyether chloroformate with a polyamine.

DETAILED DESCRIPTION OF PREFERRED EMBODIMENTS OF THE INVENTION

A more comprehensive understanding of the concept of the invention can be achieved by reference to the drawing.

The drawing provides a block-flow diagram of an embodiment of this invention. In this embodiment, a polyamine (ethylenediamine) reacts with alkylphenol poly(oxybutylene) chloroformate having a molecular weight of about 1800. The chloroformate reactant is introduced through line 1 and blended in static mixer K-1 with aromatic solvent fed from line 2 in about equal amounts by weight. The chloroformate/solvent blend is next sent via line 5 to be mixed and reacted with polyamine (containing a limited amount of water) from line 4 in static mixer K-2. The polyamine consists of fresh made-up polyamine from line 3 and recycled polyamine from the product still overhead separator V-6 from line 21. The exothermic reaction of chloroformate and polyamine is very rapid and is completed as soon as the streams are mixed. Speed of mixing is important to the success of the reaction step which has as its object the production of a monocarbamate product. The polyamine feed to the reaction mixer K-2 is set by operating conditions downstream in the separators V-1 and V-4 rather than the requirements of the reaction itself. Under normal operating conditions with solvent recycle, the reaction is carried out at a polyamine/chloroformate mol ratio of about 20:1. This ratio is set to provide sufficient amounts of a polyamine-rich phase for good chloride removal downstream in the first separator V-1. When the plant is operated without solvent recycle, a polyamine/chloroformate ratio of 30:1 is preferred to permit good phase separation in the downstream separators. Consequently, the polyamine/chloroformate ratios in the reaction step are much higher than necessary to achieve a high yield of monocarbamate. Ratios above 5:1 only marginally improve monocarbamate yield as long as rapid mixing of polyamine and chloroformate is achieved. The reaction mixture from K-2 by way of line 6 is combined with recycle solvent from line 7 in static mixer K-3 and sent via line 8 to the first-stage separator V-1. The mixture separates in V-1 into relatively clear upper and lower phases. The normal operating temperature for the first-stage separator V-1 is about 195° F. (90° C.) but higher temperatures, e.g., up to about 230° F. (110° C.) may be used provided in any case that the pressure is adequate to prevent boiling. The water content of the polyamine-rich phase in the separator, while not directly controlled at this point, is an important parameter effecting separator performance. Under normal operating conditions the lower phase in V-1 will contain about 14% water. Both higher and lower levels will tend to adversely affect separator performance. A reasonable operating range under these conditions is about 11–18% water by weight. The density difference between the upper and lower phases in V-1 is very small, there being only about 0.05 difference in specific gravity between them. Consequently, any temperature gradient in the separator could easily have an adverse effect on performance and the vessel is completely insulated to minimize heat loss. The hydrocarbon-rich upper phase from the separator normally contains about 100 ppm chloride. This upper phase flows via line 14 to the second separation stage where chloride is further reduced. Most of the free polyamine in the lower phase from V-1 is recovered by flashing the lower phase taken via line 9 under vacuum conditions in V-2. This polyamine-rich lower phase from the separator V-1 contains the bulk of the polyamine hydrochloride. The polyamine hydrochloride waste stream is removed as the flash bottoms product by line 10. The collected condensate from V-2 is pumped via line 11 to the polyamine wash surge V-3 into which make-up water enters via line 12.

Residual chloride in the upper hydrocarbon-rich phase from the first-stage separator is reduced to less than 10 ppm by washing with polyamine containing limited amounts of water, and separating the resultant two-phase mixture. Polyamine fed to the wash mixture in K-4 is pumped from the polyamine wash surge V-3 via line 13, heated to the separator operating temperature (90° C.) and mixed with the product/solvent phase from V-1 moving via line 14. The polyamine/product wash mixture from K-4 moves from line 15 into the second-stage separator V-4 which normally operates at the same temperature as V-1. Phase separation in this second stage is more difficult than the first stage due largely to an even smaller difference in density between the phases. V-4 is also fully insulated. The water content of the polyamine wash to the polyamine wash mixer K-4 is normally controlled at about 16 weight percent. Control is achieved by monotoring the water content in V-3 and adjusting water make-up as required. Control of water content at this point also assures that water content of the polyamine feed to the first-stage separator via lines 19, 20, 21 and 4 is correct. The performance of both the first- and second-stage separators is optimized by water content of about 16 weight percent water in the polyamine stream. A preferred operating range is about 13–20 weight percent water. The upper phase from V-4 flows by way of line 16 to the product still V-5. The product still removes polyamine and water from the final product in order to meet the specifications for water-soluble base and water content. Vacuum operation is achieved by pulling a vacuum at line 22. The overhead from the product still (line 17) consisting of polyamine, solvent and water, and the lower polyamine-rich phase from the second-stage separator (line 18) are combined with the polyamine wash bypass from V-3 (line 19) and are pumped by way of line 20 to the product still overhead separator V-6 where phase separation is accomplished. The upper solvent phase in V-6 provides solvent recycled through line 7 to be mixed with the reaction mixture in static mixer K-3. The lower polyamine phase in V-6 from line 21 is combined with make-up polyamine from line 3 and pumped to the front end to provide the polyamine feed to reaction mixture K-2. The net bottoms product from the product still exits at line 23.

REACTANTS

The polymeric chloroformate is a hydrocarbyl-capped poly(oxyalkylene) chloroformate of molecular weight from about 500 to about 10,000, preferably from about 500 to 5000. The hydrocarbyl-capped poly(oxyalkylene) polymers are monohydroxy compounds, i.e., alcohols, often termed monohydroxy polyethers. Hydrocarbyl-terminated poly(oxyalkylene) alcohols are produced by the addition of lower alkylene oxides, such as propylene oxide, to a hydroxy compound, ROH, under polymerization conditions, wherein R is a $C_1$–$C_{30}$ alkyl, aryl, or alkaryl group. Preferably, the polymeric chloroformate is formed from the aforesaid polymers by reacting a hydroxyl-containing polymer with phosgene. A preferred polymeric chloroformate is an alkylphenyl-capped poly(oxyalkylene) chloroformate, such as dodecylphenyl poly(oxybutylene) chloroformate. Preferably, the oxyalkylene units are selected from $C_2$–$C_5$ oxyalkylene units such as are provided by oxirane, methyloxirane, ethyloxirane and propyloxirane.

The polyamine is water soluble. It contains from 2 to 10 carbon atoms and from 2 to 5 nitrogen atoms, preferably from 2 to 6 carbon atoms and from 2 to 4 nitrogen atoms. At least one of the amino nitrogens in the polyamine is a primary or secondary amino nitrogen. Mixtures of polyamines may also be used. The polyamine may be substituted with hydrogen, lower hydrocarbyl groups, or other substituents selected from lower acyl, keto, hydroxy, nitro, and cyano groups. Preferably the polyamine is a polyalkylene polyamine, wherein the alkylene is a $C_2$–$C_6$ alkylene group, such as ethylenediamine, diethylenetriamine, triethylenetetraamine, tetraethylenepentamine, dimethylaminopropyl amine, N-(2-hydroxyethyl)diethylenetriamine, propylenediamine, dipropylenetriamine, tripropylenetetra-amine, etc. More preferably the polyalkylene polyamine is an ethylene or propylene polyamine such as ethylenediamine or dipropylenetriamine, and ethylenediamine is the most preferred.

The solvent is generally a hydrocarbon solvent. Generally, aromatic solvents of from 6 to about 16 carbon atoms are used and aromatic solvents of from 8 to 10 carbon atoms are preferred. Such solvents are exemplified by the xylenes, ethylbenzene, and cumene or other $C_9-C_{10}$ alkylbenzenes.

PROCESS CONDITIONS

The process of the present invention may be practiced continuously or in batches. In the process of this invention a reactant stream of said polymeric chloroformate is very rapidly contacted and thoroughly mixed with a reactant stream of said polyalkylene polyamine at a temperature of from about 0° C. to about 150° C. for the purpose of forming the product polymeric carbamate. Rapid thorough mixing is accomplished by using a static in-line mixing assembly. The duration of mixing is also important since contact time must be sufficient to permit the hydrochloride to transfer from the polyether aminocarbamate product to the polyamine in a secondary reaction step. Without sufficient mixing time, excessive chloride ion remains in the hydrocarbon phase after the water-containing polyamine hydrochloride phase has separated from it. Peferably a reaction temperature of from about 20° C. to 65° C. is used. Most preferably the reaction temperature is about 25° C. The reactant stream of polymeric chloroformate contains about 20–80 weight percent of polyamine chloroformate, the remainder being made up of said hydrocarbon solvent. Preferably about 40–60 weight percent polymeric chloroformate is found in said reactant stream. The polyamine reactant stream contains from about 65 to about 94% polyamine, the remainder being made up of water, i.e., 35–6 weight percent water.

Surprisingly, the water has no apparent effect on the reaction, either as to rate of reaction or yield of carbamate. A small amount of water in a limited range is needed, because while insufficient water results in too small an aqueous hydrochloride-containing phase and poor chloride removal, too much water causes haziness and poor phase separation. Preferably about 80 weight percent to 90 weight percent amine and 20 weight percent to about 10 weight percent water is used. Amounts of water below about 6 weight percent allow too much chloride to reach the final product distillation, while amounts greater than about 35 weight percent or more produce increasing amounts of haze which indicates poor separation.

The mol ratio of polyamine to polymeric chloroformate in said reactant streams is from about 5:1 to about 45:1, preferably from about 10:1 to 30:1.

The thoroughly mixed product mixture comprising polymeric carbamate and excess polyamine as well as hydrocarbon solvent, water and an amount of polyamine hydrochloride equimolar to carbamate, is drawn into a settling vessel (separator) where the hydrochloride- and water-containing polyamine phase is permitted to separate from the lighter hydrocarbon phase. Because of the polymeric nature of the product carbamate in the upper hydrocarbon phase, improper feed mixtures can produce a high viscosity upper phase which hinders separation and removal of chloride. Likewise, improper feed mixtures which result in small density diferences between the phases, or emulsions, or small chloride-containing phase volume relative to the upper phase volume, can also hinder phase separation. Consequently, separation temperatures and amounts of materials present, particularly the amount of water present, are critically selected to avoid these conditions. The optimum amount of water present is also related to the temperature of separation. At a separation temperature of about 90° C., water contents in the polyamine phase greater than about 35 weight percent causes too slow a separation, while less than 2 weight percent water in the polyamine phase does not yield a large enough chloride and water-containing polyamine phase. Generally, temperatures of about 80° C. and higher (up to 110° C.) are preferred for separation, e.g., about 90° C. is most preferred, but generally separation occurs at 20° C.–120° C. Surprisingly, the process can be run continuously because of the short time needed for separation at about 90° C. with 10–20 weight percent water in the polyamine reactant stream to the reaction mixer.

In a preferred embodiment of the present invention two separations are used to insure low residual chloride in the hydrocarbon phase. After an initial separation, the chloride- and water-containing polyamine phase is sent to a flash distillation vessel. It is to be understood that other polyamine recovery systems are usable within the scope of the present invention so that this choice of the polyamine recovery system is not limiting. A portion of the overhead from the flasher is combined with the hydrocarbon phase from the first separator and thoroughly mixed. The overhead contains polyamine and a limited amount of water so that the mixing serves to wash chloride from the hydrocarbon phase. This wash mixture is sent into a second stage of separation. This separation is effected over a similar range of temperature and water content as for the initial separation. Preferably the polyamine wash stream to the interstage wash mixer contains about 10–20 weight percent water and the separation is preferably performed at about 80° C.–110° C. In the second stage separator the water content of the mixture is even more critical than in first-stage separation in order to obtain phase separation. Too large a water content of the polyamine stream leads to increasing emulsification, but at too low water concentrations, depending on the particular polyamine, the solvent composition and concentration, the type of polyether aminocarbamate, and the temperature, the two phases will have equivalent densities and will not separate at all. In a preferred case of an ethylenediamine wash, wherein the product phase comprises 50 weight percent of $C_9-C_{10}$ aromatic solvent and an alkylphenyl poly(oxybutylene) aminocarbamate of about 1800 molecular weight, equalization of phase densities occurs at about 6–8 weight percent water at 80° C. When the water concentration is too low the polyamine phase remains suspended as droplets or large drops in the product/solvent phase.

The hydrocarbon phase from the second separator is sent directly to a product still from which the final product carbamate is obtained as a bottoms product. The use of two stages of separation with thorough interstage washing with a polyamine-water stream serves to reduce the chloride concentration in the hydrocarbon phase to less than about 10 ppm. Very low levels of chloride are preferred to prevent corrosion and plugging of the still.

EXAMPLES

The following examples are based on experiments carried out in the laboratory and in part on pilot plant demonstration of key steps in the process. All parts are given as parts by weight per hour.

EXAMPLE 1

2,666 parts by weight of mixed didodecylphenyl and dodecylphenyl ether of poly(ethyloxirane) chloroformate, having an average of 15 butylene oxide groups per molecule, is combined at 60° F. with 2,666 parts of a $C_9$–$C_{10}$ aromatic solvent in an in-line static mixer. This mixture is subsequently mixed with 2,056 parts of a water-containing ethylenediamine (EDA) stream in a second static mixer, the reaction static mixer, which achieves nearly instantaneous mixing. The ethylenediamine contains 216 parts of fresh make-up ethylenediamine and 1,521 parts of recycle diamine from a product still overhead separator. Sufficient water is contained in the recycle stream to give a final water concentration of about 11% water by weight relative to ethyelendiamine in the EDA stream. The remainder of the EDA stream is made up of a small amount of solvent which is soluble in the recycled EDA. Complete and thorough mixing of the reactant stream takes place in the static mixer, and after an additional residence time, the crude product stream is removed and combined with 1,015 parts of recycled solvent itself containing 6.5 weight percent ethylenediamine. The resulting mixture, 8,403 parts, containing 2.7 weight percent water, is then charged to the first separator. The first separator is maintained at 90° C. Separation takes place rapidly and the lower phase, 1,326 parts, is withdrawn to a flash distillation vessel. This lower phase contains 14 weight percent water in a mixture consisting primarily of 145 parts of ethylenediamine hydrochloride and 938 parts of ethylenediamine. The remainder is mainly solvent. The upper phase, 7.077 parts, is withdrawn for mixing with an EDA wash stream. This upper phase contains 2,686 parts of product, 3,650 parts of solvent, two parts of ethylenediamine hydrochloride, and 696 parts of unreacted ethylenediamine. The water content of the upper phase is only about 0.5 weight percent. The lower phase is charged through a flash distillation vessel operating at 4 psia with a bottoms temperature of 245° F. The high-boiling residue, 196 parts, withdrawn from the flasher contains the polyaminehydrochloride, as well as two parts of product, and 40 parts of ethylenediamine. This bottoms material is sent to disposal or can be further treated for additional diamine recovery. Removal of additional ethylenediamine by simple vaporization results in crystallization of the stream and makes handling difficult. The overhead portion from this flasher, 1,130 parts, is removed and charged to a surge vessel. A portion of the material in the surge vessel, 794 parts, containing 79 weight percent ethylenediamine, 5% solvent and 16% water, is combined with the upper phase from the first separator in a static mixing device. The combined upper phase and wash streams, 7,871 parts, containing 2% water, is charged to the second separator, maintained at 90° C. In this separator the remaining hydrochloride, two parts, is withdrawn with the lower phase, 639 parts, to be combined with the excess EDA from the surge tank. This stream also contains 489 parts of ethylenediamine and 118 parts of water (18.5 weight percent), the remainder being solvent and product. After combining this lower phase with the excess from the surge vessel, the combined stream is sent to the product still overhead separator.

The upper phase from the second separator, 7,232 parts, is charged to a distillation column. This column is maintained at the top at 160° F. and 2.5 psia by a vacuum system. A small amount, approximately 11 parts, of water, solvent, and ethylenediamine is lost through the vacuum system. The column has a bottoms temperature of 265° F. at about 4 psia pressure. The bottoms fraction, 5,348 parts, from this distillation column contains 2,685 parts of product in the aromatic solvent. A condensed distillate fraction removed from the column contains 1,001 parts of solvent, 834 parts of ethylenediamine and 49 parts of water. This fraction is charged to theoverhead separator. The overhead separator is operated at about 100° F. The upper layer, 1,015 parts of recycle solvent is recycled back to dilute the reaction mixture entering the first separator. The lower layer, containing recycle EDA, is combined with fresh make-up ethylenediamine before charging to the reaction static mixer. The final product contains about 50% solvent and less than 7 ppm chloride. Only about 3 weight percent of the final product is the dicarbamate of ethylenediamine. The product contains about 0.05 weight percent water and the active component (about 47 weight percent) is essentially identical to the mixed didodecylphenyl and dodecylphenyl ethers of poly(ethyloxirane)-mono-[N-(2-aminoethyl)carbamate] prepared by batch methods.

EXAMPLE 2

Operating parameters varied widely during successful test runs of a pilot plant constructed according to the present invention. Typical approximate operating conditions for one run on ethylenediamine (EDA) and alkylphenylpoly(oxybutylene) dichloroformate of about 1800 molecular weight in a $C_8$–$C_{10}$ aromatic solvent are found in Table 1 and compositions for such a run in Table 2.

TABLE 1

| | |
|---|---|
| Chloroformate Feed Rate, ml/Min. | 60–80 |
| EDA Feed Rate, ml/Min. | 45–60 |
| EDA/Chloroformate Mole Ratio | 10:1 to 20:1 |
| Water Contents of EDA, wt % | 6–10 |
| Temperature of Separators I and II, °C. | 93 |
| Product Still | |
| Overhead Pressure, Torr | 92 |
| Pressure Drop, Torr | 10–12 |
| Temperature, °C. | |
| Feed | 77 |
| Bottoms | 110 |
| Product Distillate, ml/Min. | 80 |
| Product Bottoms, ml/Min. | 20 |
| EDA Flash Unit | |
| Pressure, Torr | 220 |
| Temperature, °C. | 121 |
| Feed Rate, ml/Min. | 40–60 |
| Bottoms Product Rate, ml/Min. | 2.5 |

TABLE 2

| Stream[1] | % EDA | % Cl⁻ | % H₂O | % Solvent | % Product | % Basic N | % N |
|---|---|---|---|---|---|---|---|
| Upper Phase Separator 1 | 13.00 | 32 ppm | 0.64 | 51.60 | 34.76 | | |
| Lower Phase Separator 1 | 68.65 | 3.64 | 16.90 | 10.81 | | | |
| EDA Flasher Overhead | 75.09 | <14 ppm | 19.42 | 5.49 | | | |
| Upper Phase Separator 2 | 12.14 | <14 ppm[2] | 0.70 | 51.56 | 35.60 | | |
| Lower Phase Separator 2 | 71.66 | 446 ppm | 16.82 | 11.48 | | | |
| EDA Flasher Bottoms | 64.39 | 28.13 | 4.26 | 3.22 | | | |

TABLE 2-continued

| Stream[1] | % EDA | % Cl[-] | % H$_2$O | % Solvent | % Product | % Basic N | % N |
|---|---|---|---|---|---|---|---|
| Product Still Overhead | 72.95 | <14 ppm | 3.34 | 23.71 | | | |
| EDA Input to Reaction Mixer | 81.96 | 342 ppm | 11.82 | 6.19 | | | |
| Product Still Bottoms | | 3 ppm | 0.04 | 59.60 | 40.36 | 0.29 | 0.52 |

[1]EDA/Chloroformate Mole Ratio approximately 20:1 All components by weight % unless ppm.
[2]Subsequent work on a more efficient semi-works separator has demonstrated <10 ppm Cl$^-$ is achievable at this point.

What is claimed is:

1. A process for the production of a poly(oxyalkylene) carbamate comprising the steps of:
   (a) contacting and mixing at a temperature of about 0° C. to about 150° C. reactant streams of poly(oxyalkylene) chloroformate and polyalkylene polyamine, wherein said polyamine contains from 2 to 10 carbon atoms and from 2 to 5 nitrogen atoms, to form a product mixture; wherein said reactant stream of chloroformate contains from 20 to 80 weight percent chloroformate in a hydrocarbon solvent, and said reactant stream of polyamine contains about 6-35 weight percent water, and the mol ratio of polyamine to chloroformate in said streams is from about 5:1 to about 45:1; and, (b) allowing said product mixture to separate at a temperature from about 20° C. to about 120° C. into two phases, a hydrocarbon phase principally comprising hydrocarbon solvent, polymeric carbamate and polyamine, and a polyamine phase principally comprising water, polyamine and polyamine hydrochloride.

2. A process according to claim 1 wherein said chloroformate is the chloroformate of a poly(oxyalkylene) alcohol and said carbamate is the carbamate of said poly(oxyalkylene) alcohol.

3. A process according to claim 2 wherein said carbamate is a monocarbamate.

4. A process according to claim 1, 2 or 3 wherein said chloroformate is the chloroformate of a poly(oxyalkylene) alcohol composed of C$_2$-C$_5$ oxyalkylene units and has an average molecular weight of about 500-10,000.

5. A process according to claim 1 wherein the mol ratio of polyamine to chloroformate in said streams is from about 10:1 to about 30:1.

6. A process according to claim 1 wherein said polyalkylene polyamine is composed of C$_2$-C$_6$ alkylene units.

7. A process according to claim 6 wherein said polyalkylene polyamine is selected from the group consisting of ethylenediamine, diethylenetriamine, triethylenetetraamine and tetraethylenepentamine.

8. A process according to claim 7 wherein said polyalkylene polyamine is ethylenediamine.

9. A process according to claim 4 wherein said poly(oxyalkylene) alcohol is a C$_1$-C$_{30}$ hydrocarbyl-capped poly(oxyalkylene) alcohol.

10. A process according to claim 9 wherein said poly(oxyalkylene) alcohol is selected from alkylphenyl poly(oxypropylene) alcohol, alkylphenyl poly(oxbutylene) alcohol and alkylphenyl poly(oxypentylene) alcohol.

11. A process according to claim 1 wherein said hydrocarbon solvent is an aromatic solvent of from 6 to 16 carbon atoms.

12. A process according to claim 11 wherein said hydrocarbon solvent is selected from xylene, ethylbenzene, and cumene or other C$_9$-C$_{10}$ alkylbenzenes, and mixtures thereof.

13. A process according to claim 1 containing the additional steps of recovering said polyalkylene polyamine from said polyamine phase by vaporization and recycling said polyalkylene polyamine to said polyalkylene polyamine reactant stream.

14. A process accordig to claim 13 wherein a portion of said recycling polyamine containing 10 to 20 weight percent water is mixed with said hydrocarbon phase and the mixture allowed to separate at a temperature of about 80° C.-110° C.

15. A process according to claim 1 wherein said reactant stream of poly(oxyalkylene) chloroformate contains about 40-60 weight percent poly(oxyalkylene) chloroformate and the remainder is hydrocarbon solvent, said polyamine is ethylenediamine, said reactant stream of ethylenediamine contains about 10-20 weight percent water, and said product mixture is allowed to separate at a temperature about 80° C.-110° C.

* * * * *